(12) United States Patent
Stewart et al.

(10) Patent No.: US 7,654,599 B2
(45) Date of Patent: Feb. 2, 2010

(54) VEHICLE BOX APPARATUS

(75) Inventors: Brad Stewart, Shelby Township, MI (US); Miguel Waldner, Troy, MI (US); Christopher T. Archutowski, Washington, MI (US)

(73) Assignee: Magna International Inc., Aurora, Ontario (CA)

( * ) Notice: Subject to any disclaimer, the term of this patent is extended or adjusted under 35 U.S.C. 154(b) by 149 days.

(21) Appl. No.: 11/687,893

(22) Filed: Mar. 19, 2007

(65) Prior Publication Data

US 2007/0236034 A1    Oct. 11, 2007

Related U.S. Application Data

(60) Provisional application No. 60/784,077, filed on Mar. 17, 2006.

(51) Int. Cl.
*B62D 33/03* (2006.01)
(52) U.S. Cl. .................. 296/26.11; 296/57.1
(58) Field of Classification Search ............. 296/26.01, 296/26.11, 181.7, 182.1, 183.1, 50, 51, 57.1, 296/61, 60, 62; 410/129, 151
See application file for complete search history.

(56) References Cited

U.S. PATENT DOCUMENTS

| | | | | |
|---|---|---|---|---|
| 4,846,487 A | * | 7/1989 | Criley | 280/166 |
| 6,966,595 B2 | * | 11/2005 | Bruford et al. | 296/57.1 |
| 7,175,218 B1 | * | 2/2007 | Keene | 296/26.08 |
| 2007/0236035 A1 | * | 10/2007 | Waldner | 296/26.11 |

* cited by examiner

*Primary Examiner*—Glenn Dayoan
*Assistant Examiner*—Melissa A Black
(74) *Attorney, Agent, or Firm*—Warn Partners, P.C.; Philip R. Warn

(57) ABSTRACT

An extender device having a base frame with two ends. There is at least one extendable arm that extends from one of the ends of the base frame that allows the bed extender to move from a retracted to an extended position. The length of the bed extender can be set by a locking mechanism located on the base frame that can be used to lock the extendable arm in position. The bed extender can be used to divide a storage compartment or it can be used to extend the length of the pick-up truck bed by using the extendable arms and a pivot mechanism connected to the extendable arms.

23 Claims, 8 Drawing Sheets

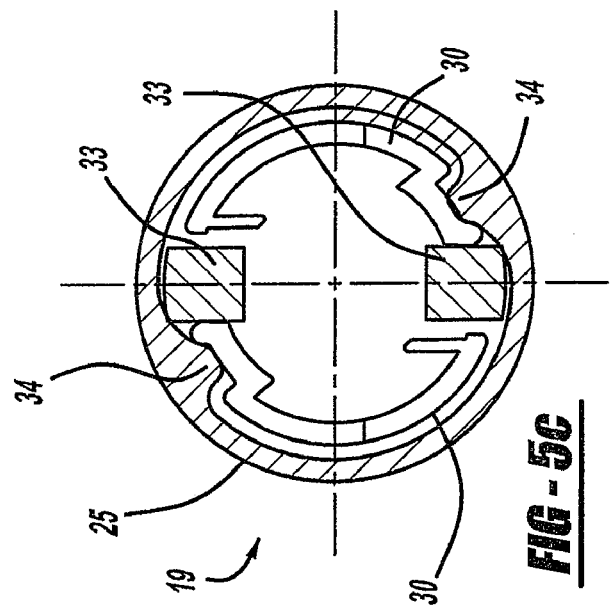
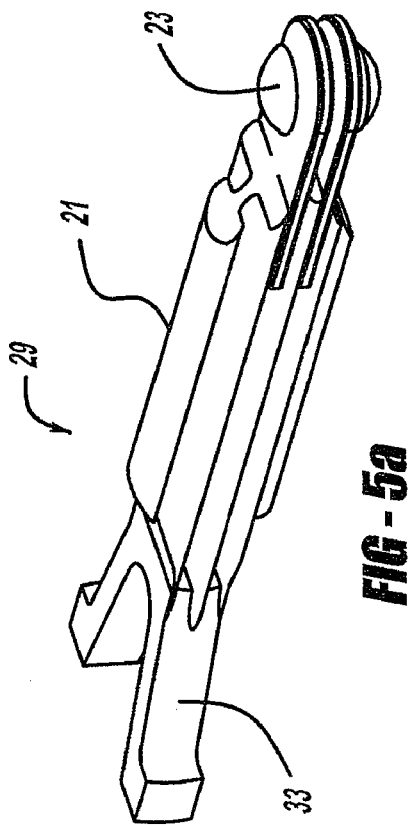
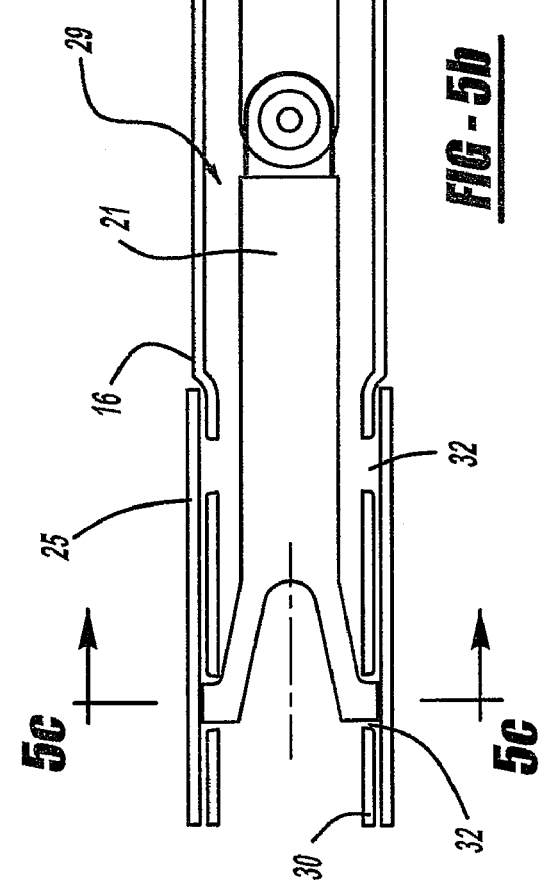
FIG-5c
FIG-5a
FIG-5b

VEHICLE BOX APPARATUS

CROSS-REFERENCE TO RELATED APPLICATIONS

This application claims the benefit of U.S. Provisional Application No. 60/784,077, filed Mar. 17, 2006. The disclosure of the above application is incorporated herein by reference.

FIELD OF THE INVENTION

The present invention relates to a bed extender for maximizing the space available in the vehicle storage compartment.

BACKGROUND OF THE INVENTION

Most vehicles provide some form of storage space or compartment. Automobiles that are in the car category usually have a storage compartment in the form of a trunk, while other larger vehicles such as pick-up trucks have a bed that can be used for storage. Additionally, semi-trucks have tractor trailers that provide a large enclosed trailer for storage of items. It is desirable to develop items that will maximize the storage space by allowing the space that's available to be sub-divided. For example it is sometimes desirable to divide a storage compartment into sections in order to provide spaces for the storage of various items. Additionally it is also desirable in the case of pick-up trucks and other vehicles having a storage bed to have a way of extending the sides of the bed in instances where oversized items need to be transported.

SUMMARY OF THE INVENTION

The present invention relates to an extender device having a base frame with two ends. There is at least one extendable arm that extends from one of the ends of the base frame that allows the bed extender to move from a retracted to an extended position. The length of the bed extender can be set by a locking mechanism located on the base frame that can be used to lock the extendable arm in position. The bed extender can be used to divide a storage compartment or it can be used to extend the length of the pick-up truck bed by using the extendable arms and a pivot mechanism connected to the extendable arms.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5*a* is a perspective view of a locking clip;

FIG. 5*b* is a plan view of a locking clip sliding in the inner clip rail;

FIG. 5*c* a cross-sectional plan view of the locking mechanism;

DETAILED DESCRIPTION OF THE PREFERRED EMBODIMENTS

The following description of the preferred embodiment(s) is merely exemplary in nature and is in no way intended to limit the invention, its application, or uses.

Referring now to FIGS. 1-8 a bed extender 10 is shown. The bed extender 10 can be stored on the interior surface of a tailgate 12. The interior surface of the tailgate 12 has a formed holder or molded recess 11 for securing the bed extender 10 at or below a surface plane of the tailgate 12. The molded recess 11 has resilient flanges or other suitable fasteners for securing the bed extender 10 when the tailgate 12 is in either the closed or open position. In one embodiment the tailgate 12 includes a storage space with a cover that encloses the bed extender 10.

Figure 1:
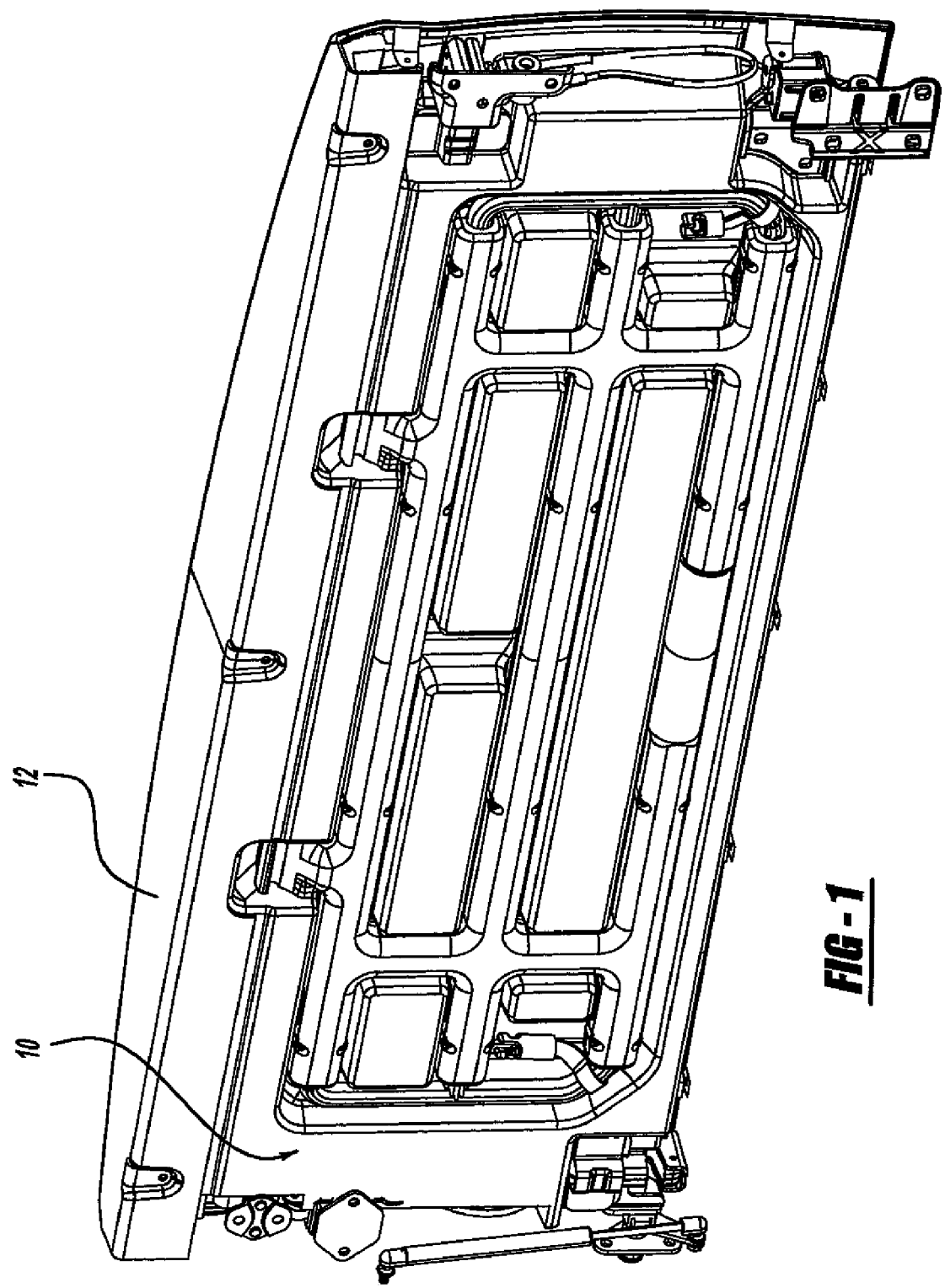
FIG. 1 is a perspective view of the bed extender locked into place on a truck tailgate in an upright position.
Figure 2:
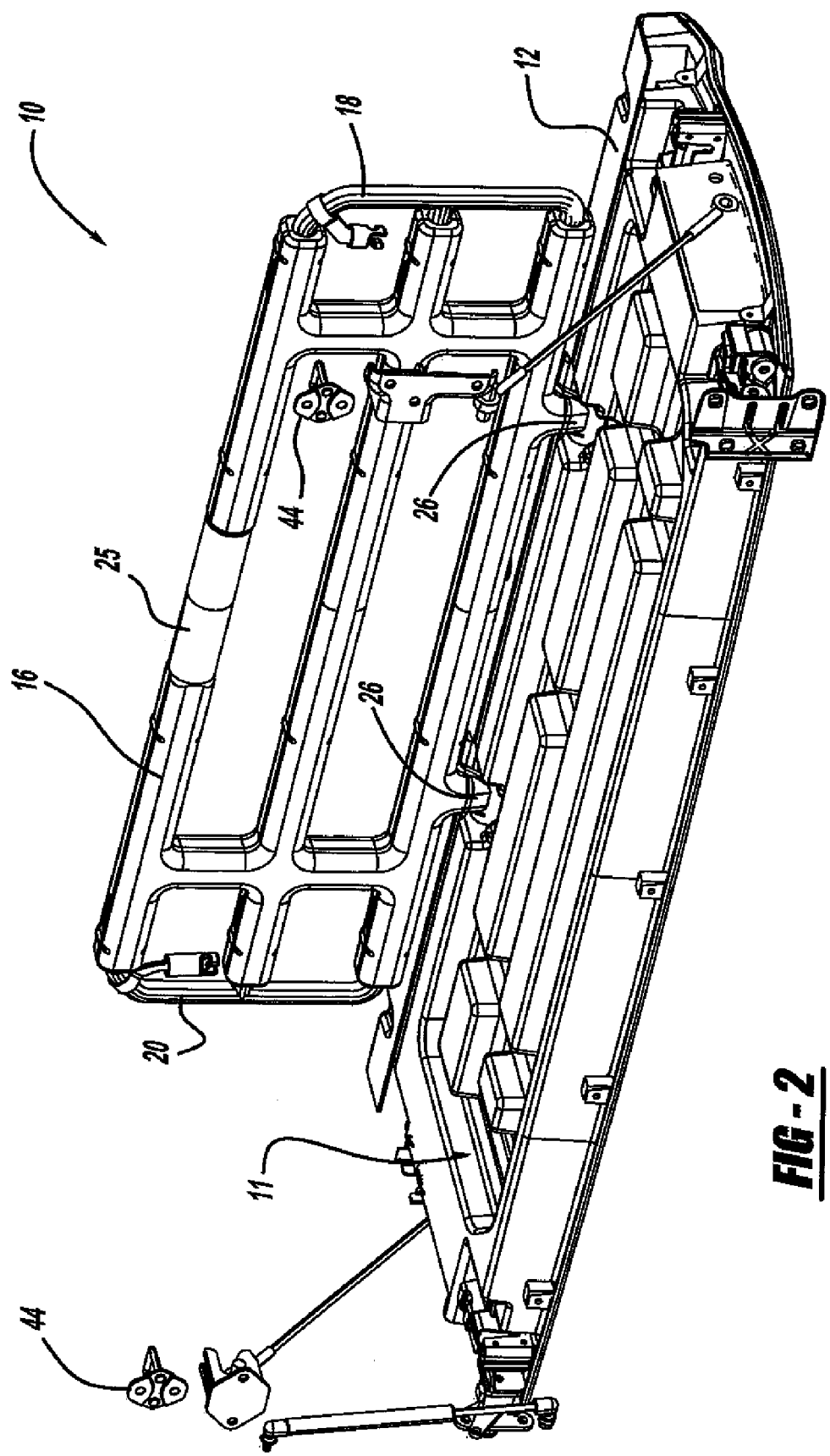
FIG. 2 is a perspective view of the tailgate in an the down position with the bed extender in an upright position.
Figure 3:
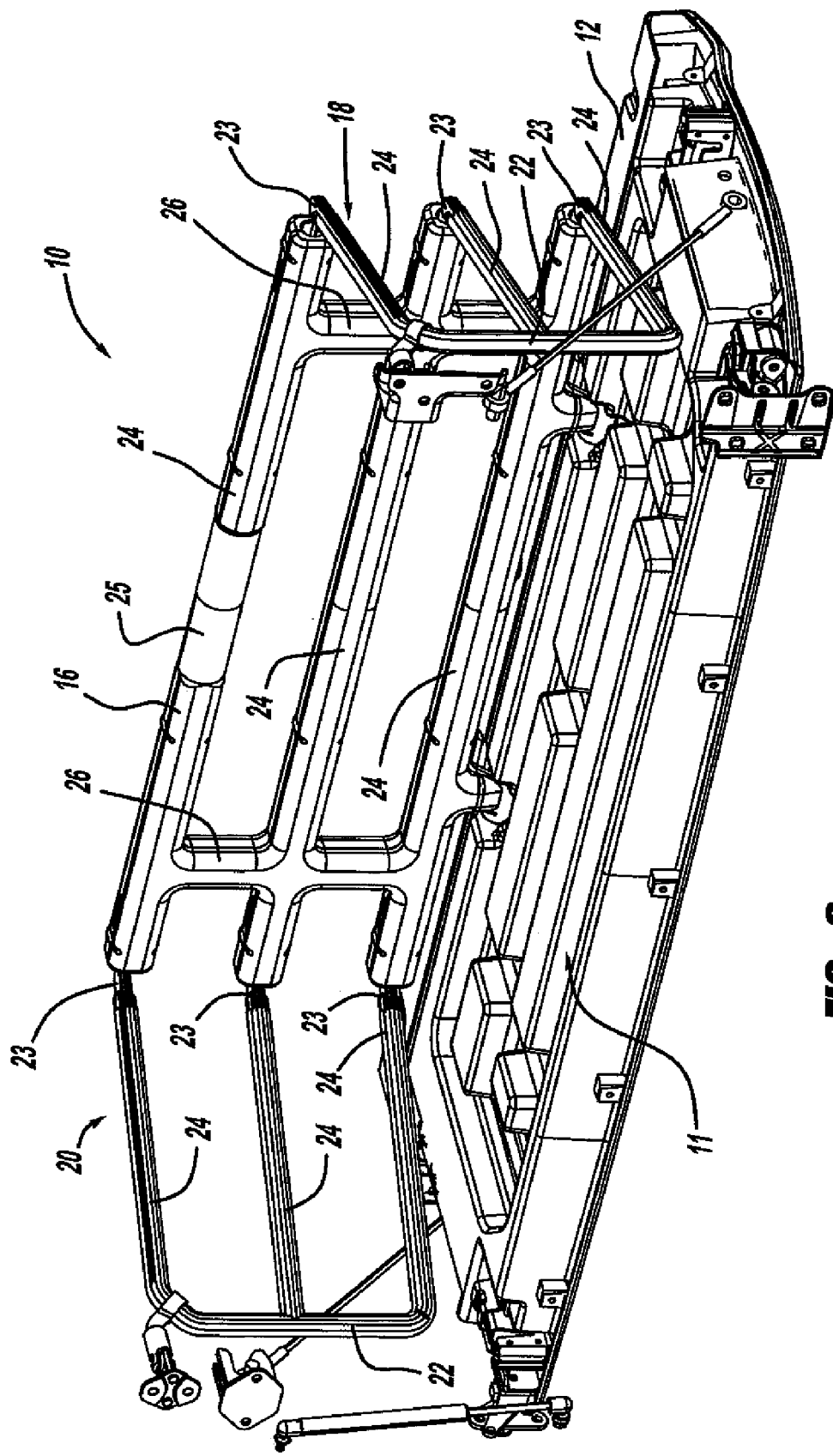
FIG. 3 is a perspective view of the bed extender in a fully extended position in accordance with one embodiment of the invention.
Figure 4:
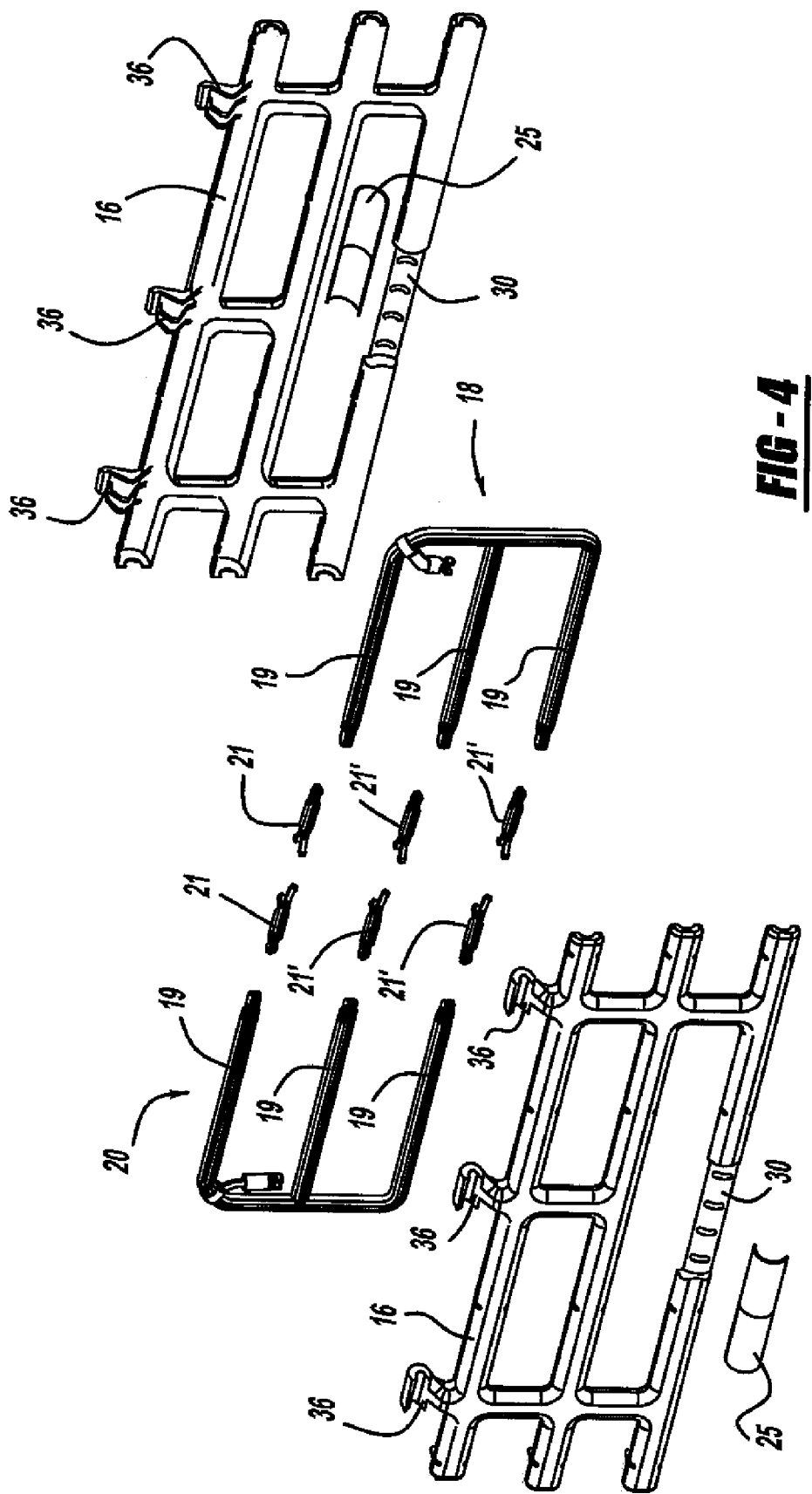
FIG. 4 is an exploded perspective view of the bed extender.
Figure 6A:
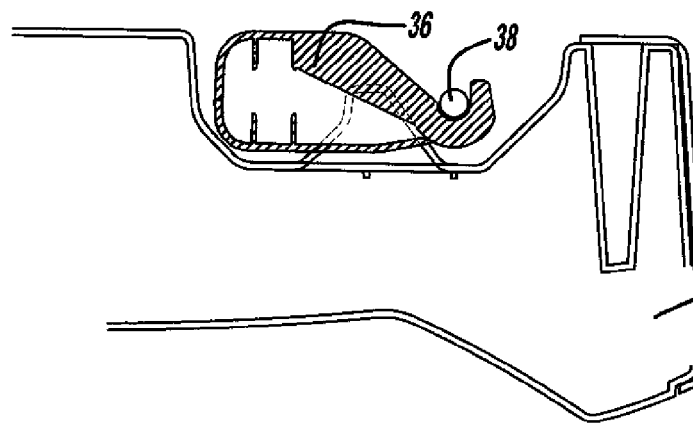
FIGS. 6*a*-6*c* are schematic cross-sectional plan views of the tailgate and hooks of the base frame.
Figure 6B:
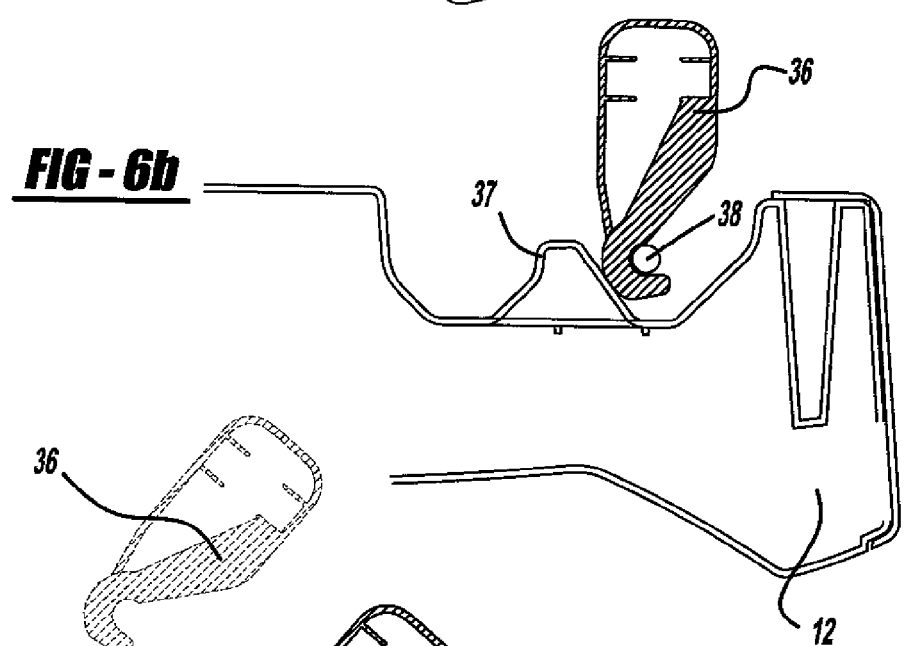
Figure 6C:
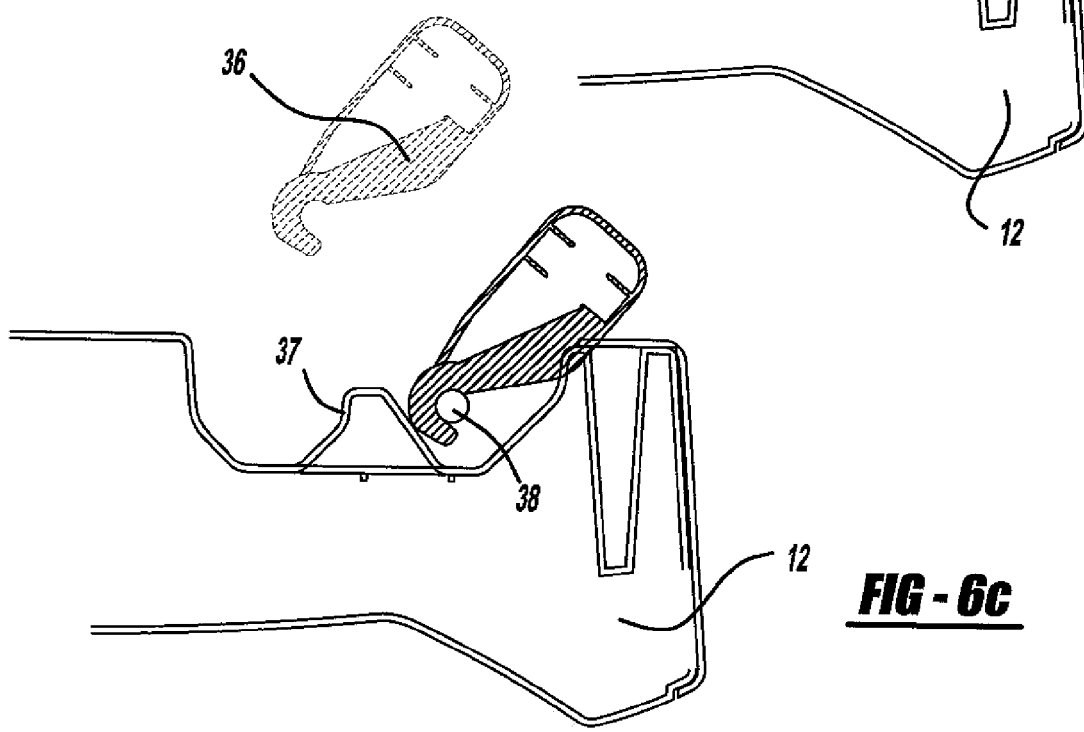
Figure 7A:
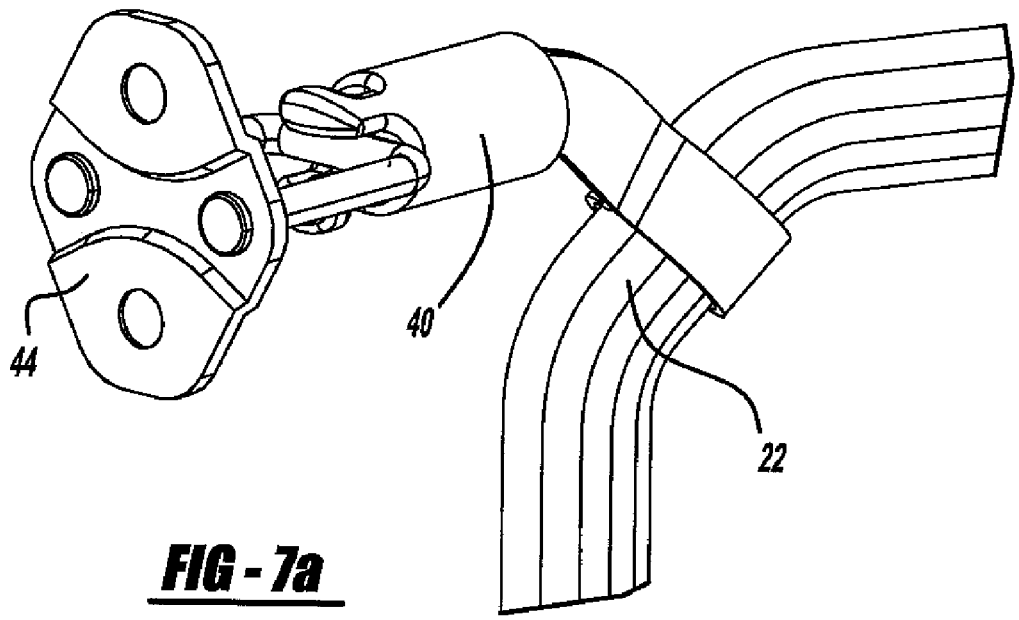
FIG. 7*a* is a perspective view of a moveable clip connected to a striker.
Figure 7B:
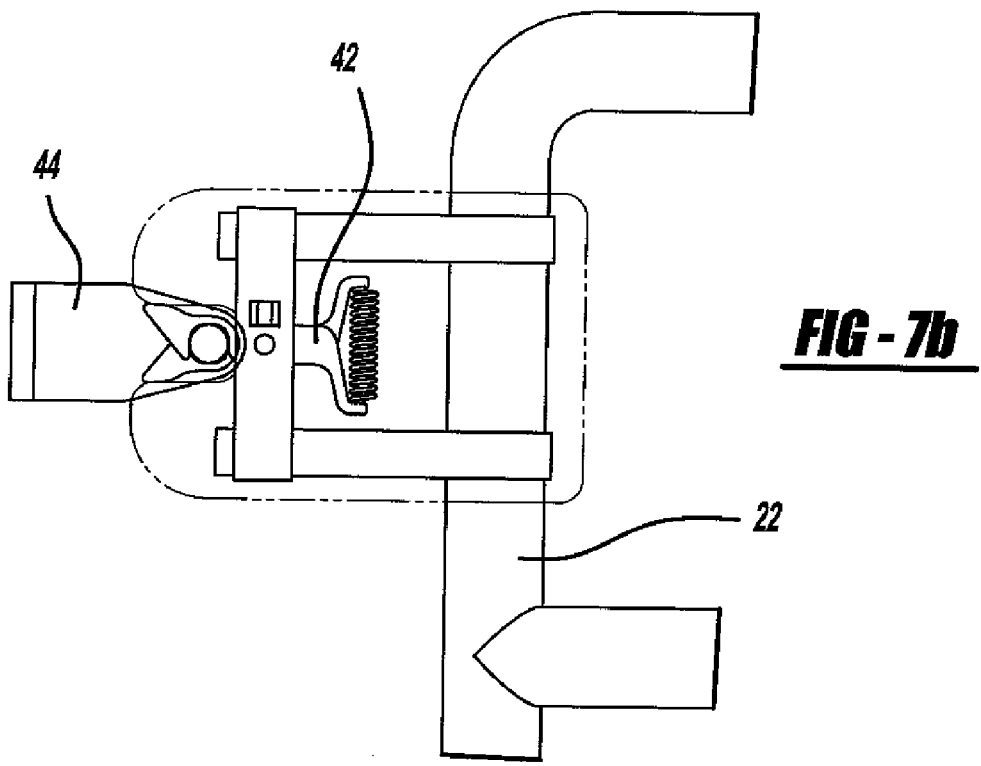
FIG. 7*b* is a sectional plan view of a moveable clip connected to a striker.
Figure 8:
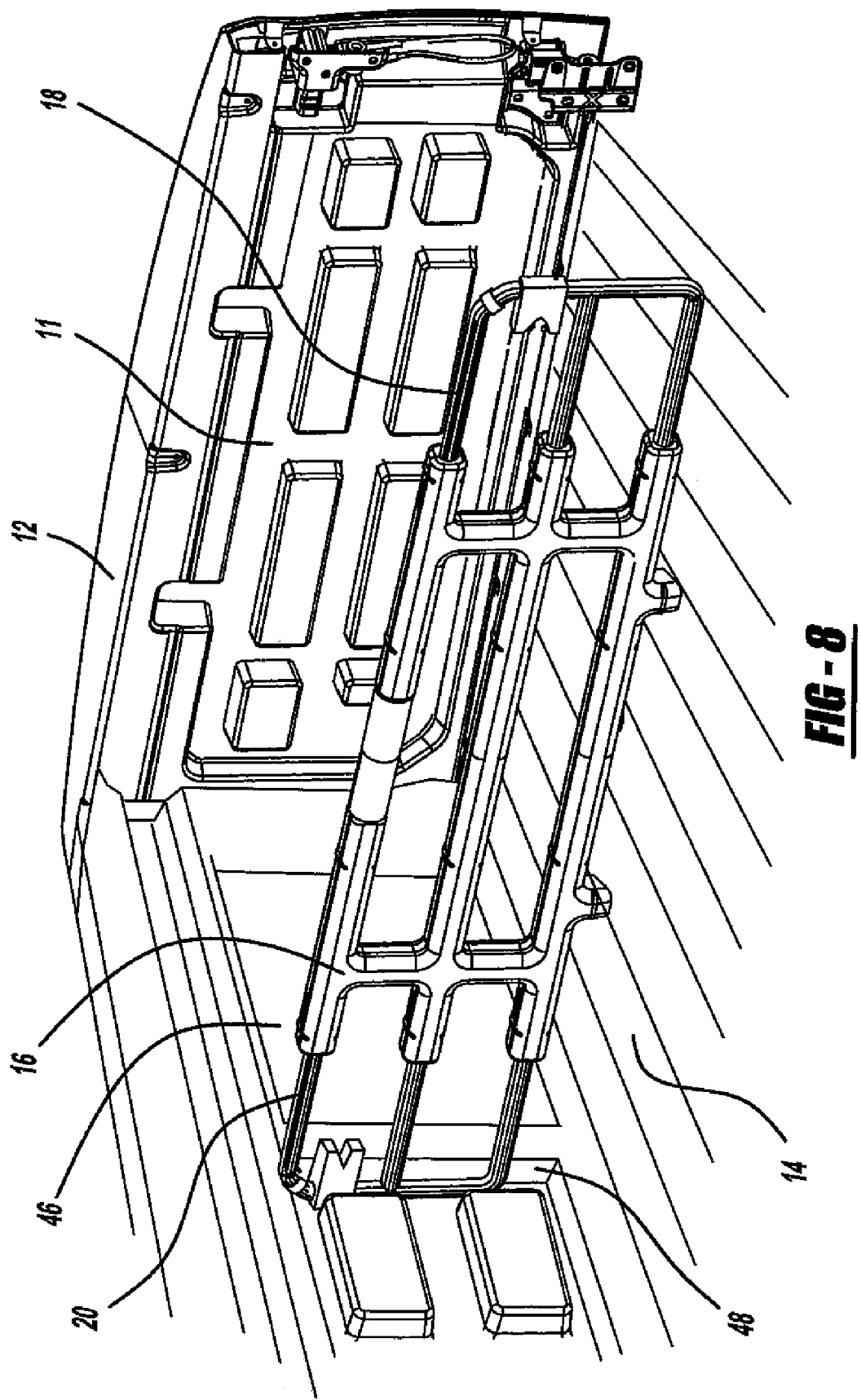
FIG. 8 is a perspective view of the bed extender being used to separate the truck bed into sections.

As shown in FIGS. 1-3 the bed extender 10 is used in one configuration to extend the length of storage area for a truck bed 14. In particular this is helpful where oversized items have to fit into the truck bed 14. FIG. 8 shows the bed extender 10 being used to divide the truck bed 14 in half which allows for different items to be placed on either side of the bed extender 10.

Referring now to all of the figures, the bed extender 10 has a base frame 16 which is shown as a tubular structure having three horizontal extensions 24 and two vertical extensions 26. A right side extendable arm 18 or first extendable arm, and a left extendable arm 20 or second extendable arm, are slidably extendable from the interior portion of the three horizontal extensions 24 of the base frame 16. The left side extendable arm 20 and right side extendable arm 18 are single piece structures; however it is possible to have multiple segments that are capable of retracting into one another in order to decrease the length of the extendable arms 18, 20 and decrease the overall package size of the bed extender 10. This embodiment of the invention uses two extendable arms; however it is within the scope of this invention for the bed extender 10 to have only a single extendable arm or more than two extendable arms.

The left and right extendable arms 18, 20 each have three horizontal tubes 19 that slide into the horizontal extensions 24 of the base frame 16. The three horizontal tubes 19 are joined together by a cross tube 22. It is within the scope of this invention for a lesser or greater number of horizontal tubes 19 and horizontal extension to be used depending on a particular application. Alternatively the bed extender 10 includes two solid left and right arms that slide into a hollow base frame 16.

At the end of the horizontal tubes 19 of the left and right extendable arms 18, 20 there are locking clips 21, 21' having pivot points 23 connectable to each of the extendable arms 18, 20. The pivot points 23 allow the left and right extendable arms 18, 20 to pivot at an angle with respect to the base frame 16 when the extendable arms 18, 20 are at or near a fully extended position.

The left and right extendable arms 18, 20 can be locked at a retracted position, a fully extended position and several predetermined positions therebetween. The intermediate positions are used for an embodiment of the invention where the bed extender is used to divide a truck bed 14 into two or more sections. Locking the left and right extendable arms 18, 20 at various lengths is accomplished using a locking mechanism 29 that includes the locking clips 21, an inner clip rail 30 and a release handle 25. The locking clips 21 slide within the inner clip rail 30 of the base frame 16. The inner clip rail 30 is integrally formed as part of the inside of the horizontal extension 24 or it can be a separate component. The release handle 25 is attached to part of the inner clip rail 30 that has one or more apertures 32 formed on the surface of the inner clip rail 30. The apertures 32 are at predetermined positions that define the positions where the left and right extendable arms 18, 20 can be locked during various points between the collapsed and fully extended positions. The inner clip rail 30 has grooves on its inner surface that guide the locking clips 21 along its sliding path. The locking clips 21 have resilient tabs 33 that snap into the apertures 32 of the inner rails 30. The release handle 15 has an inner surface that is adjacent the apertures 32 of the inner clip rail 30. The inner surface of the release handle has protrusions 34 formed on the inner surface. When the release handle 25 is rotated with respect to the inner clip rail 30 the protrusions 34 engage and release the resilient tabs 33 and/or prevent them from sliding into the apertures 32 when the locking clips 21 are sliding along the inner clip rail 30. In operation a user the bed extender 10 will simply turn the release handle 25 and slide the left or right extendable arms 18, 20 to a desired length; then release the release handle 25 and pull the left or right extendable arms 18, 20 until the resilient tabs 33 snap in to the next closest aperture 32.

The other horizontal extensions 24 that do not have a release handle 25 have locking clips 21' that are used for facilitating the sliding, pivoting of the left and right extendable arms 18, 20 as well as stopping the extension of the left and right extendable arms 18, 20 when they reach the end of the horizontal extension 24. The locking clips 21' slide on an inner clip rail that does not have apertures. The locking clips 21' can still have tabs 33 but there will be no apertures for locking. Alternatively the locking clips 21' can have a different design without tabs 33 which can save materials.

When the bed extender 10 is stored in the holder 11 of the tailgate 12 the two vertical extensions have hooks 36 that slide into a tailgate holding feature 37 formed in the holder 11. The hooks 36 rotatably clasp onto and are positioned between the tailgate 12 and a bar 38 when the bed extender is in the stowed position. If the bed extender 10 is going to be used to extend the surface of a truck bed 14 then the bed extender 10 is snapped out of the holder 11 and rotated to an approximately ninety degree angle; the left and right extendable arms 18, 20 are extended and secured. If the bed extender 10 is to be removed then the bed extender 10 has to be rotated past ninety degrees until the hooks 36 are clear from the tailgate holding feature 37 and can be pulled away from the bar 38.

When the bed extender 10 is used to increase the usable area of a truck bed 14, it is desirable to secure the left and right extendable arms 18, 20. Clasps 40 are connected to the cross tubes 22 of each of the left and right extendable arms 18, 20. The clasps 40 have spring clips 42 or other suitable releasable fasteners that grasp a striker 44 connected to the vehicle.

In another aspect of the invention the bed extender 10 is used to subdivide the truck bed 14 into two or more sections. As shown in FIG. 8 the truck bed 14 has a side wall 46 having one or more vertical grooves 48 that serve as a vertical locking structure. The vertical grooves 48 are configured to receive the bed extender 10 into one of the vertical grooves 48 to secure the bed extender 10 in a vertical position so that it subdivides the truck bed 14. While this particular embodiment describes the use of one or more vertical grooves 48 to lock the bed extender 10 in the upright position, it is possible for the vertical locking structure to be other structures or arrangements such as one or more apertures formed on a surface of a bed or tailgate; one or more hooks for grasping bars in the truck bed; and, brackets and rails with grooves for receiving and holding a portion of said bed extender. While FIG. 8 shows a single side wall 46, it is understood that the truck bed 14 will have two side walls; however, it is not necessary to have grooves on both of the side walls 48.

It is also within the scope of this invention for the bed extender 10 to be used in other vehicles besides pick-ups. For example, the bed extender 10 can be used to sub-divide a car trunk or extend the length or width of a trailer.

In another alternate embodiment of the invention a netting or panel is extended across the horizontal tubes 19 and base frame 16 of the bed extender 10 to block an open space where smaller objects can fall through.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A bed extender device comprising:
   a base frame having one or more vertical extensions and one or more horizontal extensions;
   a right extendable arm extendable from said one or more horizontal extensions;
   a left extendable arm extendable from said one or more horizontal extensions;
   an inner clip rail operably connected to the inside surface of at said base frame;
   at least one locking clip on each said right extendable arm and said left extendable arm, said at least one locking clip being slidably engaged to said inner clip rail and operably configured to releasably lock said locking clip to said inner clip rail, wherein said inner clip rail has one or more apertures and said at least one locking clip has one or more tabs that engage said one or more apertures to lock said inner clip rail and said at least one locking clip together; and
   a release handle operably engaged to said inner clip rail for selectively releasing said at least one locking clip when said locking clip is locked to said inner clip rail, wherein said release handle has one or more protrusions on the interior surface of said release handle, said one or more protrusions are aligned with said apertures so that when said release handle is rotated relative to said inner clip rail said one or more protrusions slide into said one or more apertures and compress said one or more tabs of said at least one locking clip so that said at least one locking clip will not lock to said inner clip rail while sliding in said inner clip rail.

2. The bed extender of claim 1 further comprising a pivot point on each of said right extendable arm and said left extendable arm for moving said right extendable arm and said left extendable arm at an angle with respect to said pivot point and said base frame.

3. The bed extender of claim 2 further comprising at least one moveable clasp on each of said right extendable arm and said left extendable arm for locking said right extendable arm and said left extendable arm at said angle.

4. The bed extender of claim 1 wherein said bed extender is stowed in a molded recess formed in a tailgate.

5. The bed extender of claim 4 further comprising:
one or more tailgate holding features and one or more bars on said molded recess;
one or more hooks formed on said base frame, wherein said one or more hooks slide past said one or more tailgate holding features and grasp said one or more bars to secure said bed extender to said tailgate.

6. The bed extender of claim 1 further comprising one or more vertical locking structures operably connected to said base frame.

7. The bed extender of claim 6 wherein one or more vertical locking structures are one selected from the group comprising:
one or more apertures formed on a surface of a bed or tailgate; one or more hooks; grooves on a side wall of said truck bed; and, brackets and rails with grooves for receiving and holding a portion of said bed extender.

8. A bed extender comprising:
a base frame having a first end and a second end;
a first extendable arm extending from said first end of said base frame wherein said first extendable arm is moveable from a collapsed position within said first end of said base frame to an extended position away from said base frame;
a second extendable arm extending from said second end of said base frame wherein said second extendable arm is moveable from a collapsed position within said second end of said base frame to an extended position away from said second end of said base frame;
an inner clip rail operably connected to the inside surface of at said base frame;
at least one locking clip on each said first extendable arm and said second extendable arm, said at least one locking clip being slidably engaged to said inner clip rail and operably configured to releasably lock said locking clip to said inner clip rail, wherein said inner clip rail has one or more apertures and said at least one locking clip has one or more tabs that engage said one or more apertures to lock said inner clip rail and said at least one locking clip together; and
a release handle operably engaged to said inner clip rail for selectively releasing said at least one locking clip when said locking clip is locked to said inner clip rail, wherein said release handle has one or more protrusions on the interior surface of said release handle, said one or more protrusions are aligned with said apertures so that when said release handle is rotated relative to said inner clip rail said one or more protrusions slide into said one or more apertures and compress said one or more tabs of said at least one locking clip so that said at least one locking clip will not lock to said inner clip rail while sliding in said inner clip rail.

9. The bed extender of claim 8 further comprising a pivot point on each said first extendable arm and said second extendable arm, wherein said pivot point allows said first extendable arm and said second extendable arm to move at an angle with respect to said base frame.

10. The bed extender of claim 9 further comprising at least one moveable clasp on said first and second extendable arms for locking said first and second extendable arms at said angle.

11. The bed extender of claim 8 wherein said first extendable arm and said second extendable arm are each made of two or more segments that will slide into each other when moved from said fully extended position to said collapsed position.

12. The bed extender of claim 8 further comprising one or more vertical locking structures operably connected to said base frame.

13. The bed extender of claim 12 wherein said one or more vertical locking structures are one selected from the group comprising:
one or more apertures formed on a surface of a bed or tailgate; locking mounts; brackets; and, rails with grooves for receiving and holding a portion of said bed extender.

14. The bed extender of claim 8 wherein said bed extender is stowed in a molded recess formed in a tailgate.

15. The bed extender of claim 14 further comprising:
one or more tailgate holding features and one or more bars on said molded recess;
one or more hooks formed on said base frame, wherein said one or more hooks slide past said one or more tailgate holding features and grasp said one or more bars to secure said bed extender to said tailgate.

16. A bed extender comprising:
a base frame having a first end and a second end;
a right extendable arm extending from said first end of said base frame wherein said right extendable arm is moveable from a collapsed position within said first end of said base frame to an extended position away from said base frame;
a left extendable arm extending from said second end of said base frame wherein said left extendable arm is moveable from a collapsed position within said second end of said base frame to an extended position away from said second end of said base frame;
an inner clip rail operably connected to the inside surface of at said base frame;
at least one locking clip on each said right extendable arm and said left extendable arm, said at least one locking clip being slidably engaged to said inner clip rail and operably configured to releasably lock said locking clip to said inner clip rail, wherein said inner clip rail has one or more apertures and said at least one locking clip has one or more tabs that engage said one or more apertures to lock said inner clip rail and said at least one locking clip together; and
a release handle operably engaged to said inner clip rail for selectively releasing said at least one locking clip when said locking clip is locked to said inner clip rail, wherein said release handle has one or more protrusions on the interior surface of said release handle, said one or more protrusions are aligned with said apertures so that when said release handle is rotated relative to said inner clip rail said one or more protrusions slide into said one or more apertures and compress said one or more tabs of said at least one locking clip so that said at least one locking clip will not lock to said inner clip rail while sliding in said inner clip rail.

17. The bed extender of claim 16 further comprising a pivot point on each said at least one locking clip wherein said pivot point allows said right extendable arm and said left extendable arm to move at an angle with respect to said base frame.

18. The bed extender of claim 17 further comprising at least one moveable clasp on each said right extendable arm and said left extendable arm for locking said right and left extendable arms at said angle.

19. The bed extender of claim 18 wherein said at least one moveable clasp has a spring clip and said spring clip is configured to clasp onto one or more strikers connected to a truck bed.

20. The bed extender of claim 16 further comprising one or more vertical locking structures operably connected to said base frame.

21. The bed extender of claim 20 wherein said one or more vertical locking structures are one selected from the group comprising:
   one or more apertures formed on a surface of a bed or tailgate, locking mounts, brackets, and rails with grooves for receiving and holding a portion of said bed extender.

22. The bed extender of claim 16 wherein said bed extender is stowed in a molded recess formed in a tailgate.

23. The bed extender of claim 22 further comprising:
   one or more tailgate holding features and one or more bars on said molded recess;
   one or more hooks formed on said base frame, wherein said one or more hooks slide past said one or more tailgate holding features and grasp said one or more bars to secure said bed extender to said tailgate.

* * * * *